(12) United States Patent
Doran

(10) Patent No.: US 7,970,691 B1
(45) Date of Patent: Jun. 28, 2011

(54) METHOD FOR SECURING LICENSING AGREEMENTS ON NEW PRODUCTS

(75) Inventor: Peter Doran, Coral Gables, FL (US)

(73) Assignee: Magma Management, Inc., Miami, FL (US)

( * ) Notice: Subject to any disclaimer, the term of this patent is extended or adjusted under 35 U.S.C. 154(b) by 859 days.

(21) Appl. No.: 11/352,735

(22) Filed: Feb. 13, 2006

(51) Int. Cl.
*G06F 17/60* (2006.01)
*G06Q 10/00* (2006.01)

(52) U.S. Cl. ................................ 705/37; 705/26; 705/35

(58) Field of Classification Search .................. 705/37, 705/310
See application file for complete search history.

(56) References Cited

U.S. PATENT DOCUMENTS

| | | | |
|---|---|---|---|
| 5,757,907 A * | 5/1998 | Cooper et al. | 705/52 |
| 6,018,714 A * | 1/2000 | Risen et al. | 705/4 |
| 6,044,354 A | 3/2000 | Asplen, Jr. | |
| 6,298,327 B1 | 10/2001 | Hunter et al. | |
| 6,463,418 B1 * | 10/2002 | Todd | 705/26 |
| 6,556,992 B1 | 4/2003 | Barney et al. | |
| 6,859,782 B2 | 2/2005 | Harshaw | |
| 6,859,922 B1 * | 2/2005 | Baker et al. | 717/125 |
| 6,862,696 B1 * | 3/2005 | Voas et al. | 714/38 |
| 6,879,990 B1 | 4/2005 | Boyer et al. | |
| 6,920,567 B1 * | 7/2005 | Doherty et al. | 726/22 |
| 6,959,280 B1 * | 10/2005 | Risen et al. | 705/4 |
| 7,231,322 B2 * | 6/2007 | Kenworthy | 702/186 |
| 7,272,572 B1 * | 9/2007 | Pienkos | 705/26 |
| 7,406,716 B2 * | 7/2008 | Kanamori et al. | 726/28 |
| 7,702,590 B2 * | 4/2010 | Malik | 705/59 |
| 7,742,992 B2 * | 6/2010 | Cronce | 705/59 |
| 7,809,653 B2 * | 10/2010 | Frank et al. | 705/1.1 |
| 2001/0013004 A1 | 8/2001 | Haris et al. | |
| 2001/0032144 A1 * | 10/2001 | Magid | 705/26 |
| 2001/0047276 A1 * | 11/2001 | Eisenhart | 705/1 |
| 2001/0047329 A1 * | 11/2001 | Ashby | 705/39 |
| 2001/0049707 A1 * | 12/2001 | Tran | 707/530 |
| 2002/0004775 A1 * | 1/2002 | Kossovsky et al. | 705/37 |
| 2002/0083152 A1 * | 6/2002 | Campara et al. | 709/217 |
| 2002/0178120 A1 * | 11/2002 | Reid et al. | 705/59 |
| 2003/0101073 A1 | 5/2003 | Vock | |
| 2003/0177071 A1 * | 9/2003 | Treese et al. | 705/26 |
| 2003/0195764 A1 * | 10/2003 | Baker et al. | 705/1 |
| 2004/0138943 A1 | 7/2004 | Silvernail | |
| 2004/0255152 A1 * | 12/2004 | Kanamori et al. | 713/201 |
| 2005/0027616 A1 * | 2/2005 | Jones et al. | 705/26 |
| 2005/0108118 A1 * | 5/2005 | Malackowski et al. | 705/30 |
| 2005/0114310 A1 | 5/2005 | Long | |
| 2005/0125358 A1 * | 6/2005 | Levin et al. | 705/59 |
| 2005/0210008 A1 * | 9/2005 | Tran et al. | 707/3 |

(Continued)

OTHER PUBLICATIONS http://www.bitlaw.com/forms/nda.html.*

(Continued)

*Primary Examiner* — Evens J Augustin

(57) ABSTRACT

A method for securing licensing agreements on newly developed products, which have been submitted to a host company, includes a plurality of steps that grants a third party company an opportunity to evaluate the product while absorbing minimal financial loss and, therefore, increasing the likelihood of successfully licensing the product on a long-term basis. After receiving an inquiry from the third party company, the host company provides a short-term licensing agreement with a development bonus to the third party company. After conducting due diligence and evaluating the product, the third party receives a long-term exclusive licensing agreement. Such a short-term and the long-term exclusive licensing agreements are executed by at least the inventor, the third party company and the host company.

17 Claims, 20 Drawing Sheets

U.S. PATENT DOCUMENTS

| | | | |
|---|---|---|---|
| 2005/0283394 A1* | 12/2005 | McGloin et al. | 705/10 |
| 2006/0064387 A1* | 3/2006 | Jose et al. | 705/59 |
| 2006/0085220 A1* | 4/2006 | Frank et al. | 705/1 |
| 2006/0123570 A1* | 6/2006 | Pace et al. | 15/22.1 |
| 2007/0073625 A1* | 3/2007 | Shelton | 705/59 |
| 2007/0226094 A1* | 9/2007 | Malackowski et al. | 705/35 |
| 2008/0215468 A1* | 9/2008 | Monsa-Chermon et al. | 705/34 |
| 2009/0187995 A1* | 7/2009 | Lopatic | 726/31 |

OTHER PUBLICATIONS

Invention Submission Corporation, Dec. 2004 (http://web.archive.org/web/20041204054500/www.inventhelp.com/index.asp).*

* cited by examiner

CONFIDENTIALITY AND NONDISCLOSURE AGREEMENT

This Confidentiality and Nondisclosure Agreement ("Agreement") is made as of this _____ day of _____ 2006, to assure the protection and preservation of the confidential and proprietary nature of information to be disclosed or made available by _____(the "disclosing party"), to _____(the "receiving party"), in connection with certain discussions and possible business negotiations.

1. Confidential Information: The term "Confidential Information" refers to all documents or information pertaining to the disclosing party's technical and business information (_____) whether such information is in oral, written, graphic, physical or electronic form, and whether such information is patented, copyrighted, or categorized as a trade secret or know how, or whether any application for patent or copyright protection is pending or contemplated. Confidential Information does not include, however, information which (i) is, or becomes, generally available to the public, other than as a result of an unauthorized disclosure by one of the parties to this Agreement, (ii) was available to the receiving party on a non-confidential basis prior to its disclosure by the disclosing party, or (iii) is independently developed or procured by the receiving party.

2. Nondisclosure of Confidential Information: Each of the receiving parties represents and warrants to the disclosing party that they will maintain the secrecy of all Confidential Information made available to them by the disclosing party and will disclose such information only to persons or entities mutually agreed to in writing by the parties. Except as otherwise provided herein, each receiving party covenants and agrees that such receiving party will use the Confidential Information only for purposes of determining whether the receiving party is interested in entering into some form of agreement or relationship with the disclosing party.

3. Return of Confidential Information: Each receiving party agrees that, whenever the disclosing party so requests, the receiving party shall promptly return all Confidential Information made available to the receiving party by the disclosing party.

4. Prohibition on Use of Confidential Information: Except as a subsequent written agreement between the parties may permit, each receiving party covenants and agrees that no Confidential Information supplied by the disclosing party will be used in any way except as permitted by this Agreement.

5. Third Parties: Either receiving party may disclose Confidential Information to any third party provided that such third party recipient of Confidential Information shall first execute a copy of this Agreement and consent to and abide by all of the terms of this Agreement as a receiving party.

6. Applicable Law: This Agreement and the legal relations between the parties shall be governed by and in accordance with the laws of the State of     except for any conflict of law principle that would require the application of the substantive law of a different jurisdiction.

7. Entire Agreement: This Agreement contains the entire agreement and understanding between the parties as to the subject matter herein, and supersedes any prior or FIG. 4    Page 1 of 2 contemporaneous understandings, commitments or agreements, oral or written, pertaining to such subject matter.

8. Assignment: This Agreement shall be binding on and inure to the benefit of the successors and assigns of the parties hereto, but none of the receiving parties hereto shall assign this Agreement without the prior written consent of the disclosing party.

9. Dispute Resolution: In the event that a dispute under or relating to this Agreement cannot be settled by mutual consultation between the parties, the parties irrevocably consent to the exclusive jurisdiction and venue of any state or federal court sitting in _____ County, _____ for the resolution of any such dispute. The prevailing party in any litigation filed with any such court, including appeals from such court, shall be entitled to an award of damages, costs and reasonable attorneys' fees.

10. Equitable Remedies: The parties hereby acknowledge and agree that, in the event of any breach of this Agreement by the receiving party, including, without limitation, the actual or threatened disclosure or use of a disclosing party's Confidential Information without prior consent of the disclosing party, the disclosing party may suffer an irreparable injury, such that no remedy at law may afford the disclosing party adequate protection against or appropriate compensation for such injury. Accordingly, the parties agree that the disclosing party shall be entitled to seek specific performance of the receiving party's obligations under this Agreement, as well as such further injunctive relief as may be granted by a court of competent jurisdiction.

<u>Disclosing party:</u>

Date: _____

Name: _____
Title: Inventor of

<u>Receiving Party:</u>

Date: _____

Name: _____
Title:

FIG. 4 (continued)  Page 2 of 2

RE: Detailed Information About

Mr.

Thank you for your recent request for more information about our client,       new product concept tentatively entitled the Global Mixer. After receiving your request, we forwarded a simple confidentiality agreement to you. As of this writing, we have not yet received this agreement back from you. To protect the unique proprietary information and intellectual property rights of our clients, all requests for detailed product design and marketing information must be followed by your written guarantee of complete confidentiality. If you never received the agreement in question please contact our offices so that we may send you a new one as quickly as possible.

We will be more than happy to provide you with much more specific data to support the feasibility and market potential of the Global Mixer as soon as you return the agreement properly signed to our offices.

We genuinely look forward to further discussions with you about the possibilities of the future development of this product and await your response.

Best Regards,

Manufacturer Response Team

FIG. 5

RE: Global Mixer

Dear

Thank you for expressing interest in the                . We are looking forward to sharing with your company all of the detailed information that we have available about this invention.

We would like to take a moment to provide you with an overview of our company's history and resources with regards to new product development and, more specifically, how we can collaborate with your company on the advancement of the Global Mixer.

has been working with inventors since early        Our dynamic growth since that time has allowed us to become the dominant new product development and marketing firm in our industry. We are involved in every step of the process from initial documentation of the concept all the way through to the signing of a product or royalty licensing agreement, and even beyond in certain situations. We have established ourselves as a global vehicle for invention commercialization by working with literally thousands of manufacturers, the media and attending leading international industry trade shows on multiple continents. We have enclosed a flyer from one of our recent trade shows that provides a glimpse of our staff and exhibit, along with a listing of our entire      trade show itinerary. We certainly hope that if your company happens to be an exhibitor or attendee of one of these events you will take a moment to stop by our booth and meet with us personally.

We are also proud of our association with various leaders in the invention development field that possess certain specialized areas of expertise crucial to the process. One such relationship is with                              a group of licensing professionals that assist in the securing of a product licensing agreement with a company willing to manufacture, market and distribute an invention as part of their product line and subsequently pay royalties to the inventor.

1as a major role in the direction that we are attempting to take with the Global Mixer. To comply with your request for additional information on the invention, we are including a full color printout of the Invention Website, as well as the Interactive Virtual Reality CD-ROM that we have created for the Global Mixer. Additionally, as part of a collaborative effort with      , we have enclosed an opportunity best described as rare in the world of new product development: Risk-free, yet potentially profitable.

FIG. 6

If, after reviewing the detailed invention information we have sent, you feel that the Global Mixer has commercial potential, we are offering you a means of securing exclusive rights to it for the next 90 days. The terms of this opportunity are outlined in the document entitled Exclusive Licensing Agreement. Once again, this is an arrangement that requires no upfront compensation from your company. In addition, has included a check for $1000.00 already payable to    in this mailing in order to help defray any start-up research costs and as a good-faith demonstration of our commitment to Global Mixer. Additionally,   is willing to consider participating further in the development process during this agreement period.

If you agree with the enclosed agreement, you may deposit the enclosed check and return the signed agreement to our office. We have enclosed a self-addressed envelope for your convenience.

Pursuant to the Exclusive Licensing Agreement, your company is under no obligation to work with the Global Mixer beyond the 90 day period. Also, at the end of the 90 day period, you will hold the exclusive option to enter into a formal licensing agreement for the invention, and    will then file for any available patent protection at our expense using your final manufacturing specifications.

We recognize that the Global Mixer like the majority of new inventions, is still a work in progress. Accordingly, we see the potential of working with    on the further development and possible commercialization of it as a mutually beneficial scenario:    and the inventor of the Global Mixer have the opportunity to leverage the expertise and resources of a company such as yours, while you obtain the exclusive rights to what could be the next major product in your industry, all without any risk to your bottom line.

We are excited about the possibility of working with your company to bring the Global Mixer to market and would like to get this process started. Please return the signed Exclusive Licensing Agreement at your earliest opportunity so that we can continue the advancement of the Global Mixer.

Regards,

Manufacturer Response Team

FIG. 6 (continued)

EXCLUSIVE LICENSING AGREEMENT

This Licensing Proposal is made this _____ day of _____ 20__ by Licensor/Inventor and Licensor's Agent, ' located at to Licensee a corporation whose mailing address is LICENSOR has developed an innovative product and is the inventor and sole owner of the invention described as the Global Mixer hereinafter "Product") and has the power and authority to grant to LICENSEE the right to secure manufacturing and marketing of said Product; and WHEREAS, LICENSEE desires to obtain from LICENSOR the exclusive right to manufacture and market said Product subject to the terms and conditions herein;

NOW, THEREFORE, in consideration of the terms and conditions set forth herein the parties do promise and agree to the following:

1. LICENSEE shall have the exclusive right to use the Product throughout the United States. LICENSEE may have said Product manufactured anywhere in the world.

2. ITT agrees to assist in the development the Product during a 90 day period. This may include any necessary research, development, prototyping, manufacturing assessments, and value added pricing . This is in addition to the initial $1000 development bonus paid by     At the conclusion of the 90 day period LICENSEE may opt to execute an extended licensing agreement with Licensor and his/her agent. Otherwise, this agreement will expire in 90 days unless extended in writing by the parties.

3. PAYMENT OF COSTS: All U.S. patent costs will be paid by Licensor's agent,     A patent will be filed upon receipt of manufacturer's final specifications for the Product. If an extended licensing agreement is reached by LICENSEE with LICENSOR and his/her agent at the conclusion of this 90 day period, all ongoing development, testing, manufacturing and marketing costs shall be born by LICENSEE.

4. ROYALTIES: In the event LICENSEE sells any units of the Product during the 90 day period, LICENSEE agrees to pay LICENSOR 1% net sales payable to     and calculated on a calendar quarterly basis. Net sales are defined as invoice price less freight, discounts and rebates. The royalty rates may be increased or reduced in an extended licensing agreement depending on volume of sales, to be determined at a later date.

5. CONFIDENTIALITY: LICENSEE agrees to abide by the terms and conditions of the Non-Disclosure Agreement previously signed by its representatives.

This agreement is duly signed in     and agreed to by all parties.

Licensor: _____     Licensee: _____
           Inventor(s)

Licensor's Agent: _____     By: _____

FIG. 7

Re: Global Mixer

Dear            ,

Recently, we forwarded a detailed package of information for Global Mixer, along with an Exclusive Licensing Agreement. Since that time, we have not heard back from you regarding your possible interest in the future development of this product.

We would like to take the opportunity to ask for your impressions and to also make sure that you received all of the information on Global Mixer. If you encountered any difficulty in accessing any of the invention design details, please do not hesitate to call our offices so that we may follow up with you and provide you with the information as you have requested.

Additionally, if you were able to review the specifics of Global Mixer but have any questions regarding the concept, please contact us so that we may attempt to arrange for a conference call with the inventor to address these. We also welcome any inquiries from you regarding the terms and conditions of the Exclusive Licensing Agreement.

We genuinely look forward to further discussions with you about the unique opportunity to further develop this product and await your response.

Regards,

Manufacturer Response Team

FIG. 8

Dear

We are pleased to inform you that we have received a signed Non-Disclosure Agreement from              In response, we are forwarding them an Exclusive Licensing Agreement Package for the Global Mixer.

The Exclusive Licensing Agreement package consists of the access information for your invention website, along with a one-page licensing proposal. This document provides the manufacturer the opportunity to enter into a 90-day licensing agreement for your product. The purpose of the 90 day period would be for              to do the necessary research and development on the Global Mixer that will eventually help them make a long-term decision on their interest in it.

We will conduct a follow-up with              by either telephone, mail, or e-mail to insure they have received the information and to answer any questions they may have. A representative of our Manufacturer's Response Team will contact you if we do receive the Exclusive Licensing Agreement back signed from             , and we will also immediately send you the agreement for your review and signature at that time. The agreement is not considered final until it is also signed by the inventor.

Regards,

Manufacturer Response Team

FIG. 9

Dear

Thank you for expressing interest in the Global Mixer. We are looking forward to sharing with your company all of the detailed information that we have available about this invention.

To comply with your request for additional information on the invention, we are providing you with the following invention website access details:

Username:
Password:

Please log on to                                    and click on the "Clients and Manufacturers Login" tab to arrive at the authentication screen, where you will be prompted to enter this information.

We would like to take a moment to provide you with an overview of our company's history and resources with regards to new product development and, more specifically, how we can collaborate with your company on the advancement of the Global Mixer.

has been working with inventors since early        . Our dynamic growth since that time has allowed us to become the dominant new product development and marketing firm in our industry. We are involved in every step of the process from initial documentation of the concept all the way through to the signing of a product or royalty licensing agreement, and even beyond in certain situations. We have established ourselves as a global vehicle for invention commercialization by working with literally thousands of manufacturers, the media and attending leading international industry trade shows on multiple continents. We have enclosed a flyer from one of our recent trade shows that provides a glimpse of our staff and exhibit, along with a listing of our entire       trade show itinerary. We certainly hope that if your company happens to be an exhibitor or attendee of one of these events you will take a moment to stop by our booth and meet with us personally.

We are also proud of our association with various leaders in the invention development field that possess certain specialized areas of expertise crucial to the process. One such relationship is with
                              , a group of licensing professionals that assist in the securing of a product licensing agreement with a company willing to manufacture, market and distribute an invention as part of their product line and subsequently pay royalties to the inventor.       has a major role in the direction that we are attempting to take with the Global Mixer.

FIG. 10

As part of a collaborative effort with          we have enclosed an opportunity best described as rare in the world of new product development: Risk-free, yet potentially profitable.

If, after reviewing the detailed invention information we have sent, you feel that the Global Mixer has commercial potential, we are offering you a means of securing exclusive rights to it for the next 90 days. The terms of this opportunity are outlined in the document entitled Exclusive Licensing Agreement. Once again, this is an arrangement that requires no upfront compensation from your company. In addition,          has included a check for $1000.00 already payable to          in this mailing in order to help defray any start-up research costs and as a good-faith demonstration of our commitment to Global Mixer. Additionally,      is willing to consider participating further in the development process during this agreement period.

If you agree with the enclosed agreement, you may return the signed agreement to our office. We have enclosed a self-addressed envelope for your convenience.

Pursuant to the Exclusive Licensing Agreement, your company is under no obligation to work with the Global Mixer beyond the 90 day period. Also, at the end of the 90 day period, you will hold the exclusive option to enter into a formal licensing agreement for the invention, and          will then file for any available patent protection at our expense using your final manufacturing specifications.

We recognize that the Global Mixer like the majority of new inventions, is still a work in progress. Accordingly, we see the potential of working with          on the further development and possible commercialization of it as a mutually beneficial scenario:          and the inventor of the Global Mixer have the opportunity to leverage the expertise and resources of a company such as yours, while you obtain the exclusive rights to what could be the next major product in your industry, all without any risk to your bottom line.

We are excited about the possibility of working with your company to bring the Global Mixer to market and would like to get this process started. Please return the signed Exclusive Licensing Agreement at your earliest opportunity so that we can continue the advancement of the Global Mixer.

Regards,

Manufacturer Response Team

FIG. 10 (continued)

EXCLUSIVE LICENSING AGREEMENT

This Licensing Proposal is made this _____ day of _____ 20__ by Licensor/Inventor, and Licensor's Agent, located at to Licensee a corporation whose mailing address is LICENSOR has developed an innovative product and is the inventor and sole owner of the invention described as the Global Mixer hereinafter "Product") and has the power and authority to grant to LICENSEE the right to secure manufacturing and marketing of said Product; and WHEREAS, LICENSEE desires to obtain from LICENSOR the exclusive right to manufacture and market said Product subject to the terms and conditions herein;

NOW, THEREFORE, in consideration of the terms and conditions set forth herein the parties do promise and agree to the following:

1. LICENSEE shall have the exclusive right to use the Product throughout the United States. LICENSEE may have said Product manufactured anywhere in the world.

2. ITT agrees to assist in the development of the Product during a 90 day period. This may include any necessary research, development, prototyping, manufacturing assessments, and value added pricing. This is in addition to the initial $1000.00 development bonus paid by     At the conclusion of the 90 day period LICENSEE may opt to execute an extended licensing agreement with Licensor and his/her agent. Otherwise, this agreement will expire in 90 days unless extended in writing by the parties.

3. PAYMENT OF COSTS: All U.S. patent costs will be paid by Licensor's agent,     A patent will be filed upon receipt of manufacturer's final specifications for the Product. If an extended licensing agreement is reached by LICENSEE with LICENSOR and his/her agent at the conclusion of this 90 day period, all ongoing development, testing, manufacturing and marketing costs shall be born by LICENSEE.

4. ROYALTIES: In the event LICENSEE sells any units of the Product during the 90 day period, LICENSEE agrees to pay LICENSOR 1% net sales payable to Licensor's Agent,     and calculated on a calendar quarterly basis. Net sales are defined as invoice price less freight, discounts and rebates. The royalty rates may be increased or reduced in an extended licensing agreement depending on volume of sales, to be determined at a later date.

5. CONFIDENTIALITY: LICENSEE agrees to abide by the terms and conditions of the Non-Disclosure Agreement previously signed by its representatives.

This agreement is duly signed in                              and agreed to by all parties.

Licensor: _____     Licensee: _____
         Inventor(s)

Licensor's Agent: _____     By: _____

FIG. 11     Page 1 of 1

Dear

Thank you for expressing interest in the Global Mixer. We are looking forward to sharing with your company all of the detailed information that we have available about this invention.

To comply with your request for additional information on the invention, we are providing you with the following invention website access details:

Username:
Password:

Please log on to                            and click on the "Clients and Manufacturers Login" tab to arrive at the authentication screen, where you will be prompted to enter this information.

We would like to take a moment to provide you with an overview of our company's history and resources with regards to new product development and, more specifically, how we can collaborate with your company on the advancement of the Global Mixer.

. has been working with inventors since early          . Our dynamic growth since that time has allowed us to become the dominant new product development and marketing firm in our industry. We are involved in every step of the process from initial documentation of the concept all the way through to the signing of a product or royalty licensing agreement, and even beyond in certain situations. We have established ourselves as a global vehicle for invention commercialization by working with literally thousands of manufacturers, the media and attending leading international industry trade shows on multiple continents. We have enclosed a flyer from one of our recent trade shows that provides a glimpse of our staff and exhibit, along with a listing of our entire        trade show itinerary. We certainly hope that if your company happens to be an exhibitor or attendee of one of these events you will take a moment to stop by our booth and meet with us personally.

We are also proud of our association with various leaders in the invention development field that possess certain specialized areas of expertise crucial to the process. One such relationship is with                                              , a group of licensing professionals that assist in the securing of a product licensing agreement with a company willing to manufacture, market and distribute an invention as part of their product line and subsequently pay royalties to the inventor.       has a major role in the direction that we are attempting to take with the Global Mixer.

FIG. 12

As part of a collaborative effort with      we have enclosed an opportunity best described as rare in the world of new product development: Risk-free, yet potentially profitable.

If, after reviewing the detailed invention information we have sent, you feel that the Global Mixer has commercial potential, we are offering you a means of securing exclusive rights to it for the next 90 days. The terms of this opportunity are outlined in the document entitled Exclusive Licensing Agreement. Once again, this is an arrangement that requires no upfront compensation from your company. In addition, is willing to consider participating further in the development process during this agreement period.

If you agree with the enclosed agreement, you may return the signed agreement to our office. We have enclosed a self-addressed envelope for your convenience.

Pursuant to the Exclusive Licensing Agreement, your company is under no obligation to work with the Global Mixer beyond the 90 day period. Also, at the end of the 90 day period, you will hold the exclusive option to enter into a formal licensing agreement for the invention, and         will then file for any available patent protection at our expense using your final manufacturing specifications.

We recognize that the Global Mixer like the majority of new inventions, is still a work in progress. Accordingly, we see the potential of working with        on the further development and possible commercialization of it as a mutually beneficial scenario:          and the inventor of the Global Mixer have the opportunity to leverage the expertise and resources of a company such as yours, while you obtain the exclusive rights to what could be the next major product in your industry, all without any risk to your bottom line.

We are excited about the possibility of working with your company to bring the Global Mixer to market and would like to get this process started. Please return the signed Exclusive Licensing Agreement at your earliest opportunity so that we can continue the advancement of the Global Mixer.

Regards,

Manufacturer Response Team

FIG. 12 (continued)

EXCLUSIVE LICENSING AGREEMENT

This Licensing Proposal is made this _____ day of _____ 20__ by Licensor/Inventor and Licensor's Agent, located at to Licensee a corporation whose mailing address LICENSOR has developed an innovative product and is the inventor and sole owner of the invention described as the Global Mixer hereinafter "Product") and has the power and authority to grant to LICENSEE the right to secure manufacturing and marketing of said Product; and WHEREAS, LICENSEE desires to obtain from LICENSOR the exclusive right to manufacture and market said Product subject to the terms and conditions herein;

NOW, THEREFORE, in consideration of the terms and conditions set forth herein the parties do promise and agree to the following:

1. LICENSEE shall have the exclusive right to use the Product throughout the United States. LICENSEE may have said Product manufactured anywhere in the world.

2. _____ agrees to assist in the development the Product during a 90 day period. This may include any necessary research, development, prototyping, manufacturing assessments, and value added pricing. At the conclusion of the 90 day period LICENSEE may opt to execute an extended licensing agreement with Licensor and his/her agent. Otherwise, this agreement will expire in 90 days unless extended in writing by the parties.

3. PAYMENT OF COSTS: All U.S. patent costs will be paid by Licensor's agent, _____ A patent will be filed upon receipt of manufacturer's final specifications for the Product. If an extended licensing agreement is reached by LICENSEE with LICENSOR and his/her agent at the conclusion of this 90 day period, all ongoing development, testing, manufacturing and marketing costs shall be born by LICENSEE.

4. ROYALTIES: In the event LICENSEE sells any units of the Product during the 90 day period, LICENSEE agrees to pay LICENSOR 1% net sales payable to Licensor's Agent, _____ and calculated on a calendar quarterly basis. Net sales are defined as invoice price less freight, discounts and rebates. The royalty rates may be increased or reduced in an extended licensing agreement depending on volume of sales, to be determined at a later date.

5. CONFIDENTIALITY: LICENSEE agrees to abide by the terms and conditions of the Non-Disclosure Agreement previously signed by its representatives.

This agreement is duly signed in _____ and agreed to by all parties.

Licensor: _____        Licensee: _____
       Inventor(s)

Licensor's Agent: _____        By: _____

Page 1 of 1

Dear

As you are aware, an Exclusive Licensing Agreement for the Global Mixer was recently signed between you and                The main purpose of this agreement is to help a company determine whether the invention will be a viable long-term product for them.

Accordingly, we have recently received communication from           that they are no longer interested in pursuing the development of the Global Mixer, or they have failed to respond to our repeated follow-up attempts.

*YOU MUST NOT GET DISCOURAGED!* This is an anticipated, even expected, part of the Exclusive Licensing Agreement process. We simply view it as being one step closer to finding a company who is willing to get involved on a long-term basis with the Global Mixer.

We will continue to pursue companies on your behalf using the Exclusive Licensing Agreement as a valuable tool.

As always, if you have any questions or concerns, please contact our Inventor Relations Team at Regards, Manufacturer Response Team

METHOD FOR SECURING LICENSING AGREEMENTS ON NEW PRODUCTS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to product licensing methods and, more particularly, to a method for securing short-term and long-term licensing agreements on new products while minimizing the financial burden on the licensee during the short-term evaluation period.

2. Prior Art

Each year thousands of new ideas are conceived by individuals and small companies throughout the United States. Often, many ideas never mature into a tangible, physical product due to lack of knowledge in marketing, manufacturing and government certification requirements. For example, some electronic inventions require UL certification from an appropriate government agency while some chemical inventions require prior approval from the Food and Drug Administration and like regulatory agencies. A small entity inventor simply does not have the knowledge of how to acquire such approvals. As a result, good ideas never reach the market and do not contribute to innovation and technological advancement in commerce.

In addition, before a product can be licensed, many criteria must be evaluated for weighing the costs and benefits such as the cost to produce the product, the benefit of employing alternate materials that have superior durability and strength, and costs associated with marketing and distribution of the product. Again, the average small entity inventor simply does not have the time or knowledge to investigate the answers to such matters. Well versed manufacturers and distributors can assist inventors to make and sell their products, but are hesitant to invest unnecessary time and money into evaluating the products and ultimately licensing the products unless there is an incentive to do so. Thus, there is a gap that must be bridged between inventors and manufacturers to promote the evaluation and development of inventions, so that the likelihood of securing a long-term licensing agreement can be improved.

Still further, after satisfying the initial hurdles of receiving agency approvals and proper guidance on manufacturing and marketing techniques, inventors are often faced with additional hurdles of learning how to protect their proprietary rights from stealthy, revenue-minded and unauthorized parties that are willing to create knock-off items and illegally benefit from the fruit of the inventor's labor. To overcome such commercial threats, inventors must seek assistance from qualified legal professionals to protect their intellectual property interests. Such legal assistance can be very expensive and, therefore, inventors often cannot afford the high costs of obtaining intellectual property protection on their inventions. For example, the average cost for obtaining utility patent protection in the United States can reach over $5000.00 for a mechanical invention. Again, the inventor becomes discouraged and lets his/her idea diminish to the public domain.

A number of systems and methods have been developed with the intent of simplifying and expediting the licensing process associated with patents. One prior art example discloses a method for determining what product to develop from a repository of product ideas, obtaining protection for the product and licensing the product to a manufacturer. Such a system, however, does not include a combination of steps for providing a short-term exclusive licensing agreement (ELA) with a good faith retainer. Another prior art example discloses a system for determining a ranked list of candidates for licensing a patent portfolio. Such an example provides a database of potential licensees and compares the list with a database of patents. This example does not show a combination of steps for providing a temporary ELA with a retainer (development bonus).

Accordingly, a need remains for a business method of securing licensing agreements on new products in order to overcome the above-noted shortcomings. The present invention satisfies such a need by providing a product licensing agreement method that is easy to use, provides improved business results for licensors and licensees, and allows for more effective use and investment of monetary funds. Such a method advantageously allows for a simpler and more expedient method of searching for and acquiring exclusive intellectual property licensing agreements and bridging the gap between inventors and manufacturers.

BRIEF SUMMARY OF THE INVENTION

In view of the foregoing background, it is therefore an object of the present invention to provide a method for securing short-term and long-term licensing agreements on new products. These and other objects, features, and advantages of the invention are provided by a method for improving a success rate for obtaining a licensing agreement on a product that an inventor has submitted to a host company.

The method includes a plurality of sequentially timed business steps. In a first one of such steps, the host company receives an inquiry from a perspective inventor client. The inquiry discloses the product to the host company. The first step preferably further includes the step of the host company sending a payment for a predetermined dollar value to the third party company for effectively and conveniently covering the costs of evaluating the product. Such a predetermined dollar value may be greater than or equal to one United States dollar. The first step may further include the host company performing a confidential screening on the product. Such a first step preferably further includes the host company requesting a state-of-the-art search to be conducted on the product for advantageously and effectively determining a scope of product development in a field of endeavor related to the product.

During the first step, the host company may post the product on a password protected website, which is managed by a centralized web server. Such a product posting includes all detailed design information available on the product, which depicts essential features of the product. The host company also performs specialized searches for seeking out at least one third party company that may be interested in making the product.

Such a host company matches the product in a proprietary product roster developed by the host company to determine whether an existing product line and existing manufacturing capabilities of the third party company are a suitable match with the product. The host company then sends an information package to the inventor. Such an information package includes contact information for a predetermined amount of third party companies that have been located on behalf of the inventor.

The first step preferably further includes the inventor mailing the promotional materials to each of the interested third party companies. After reading the promotional materials, the third party companies interested in learning more about the product contacts the host company via a communication medium. Such a communication medium preferably includes at least one communication medium selected from the group including an email message, a telephone call, a fax transmission and a tear off card.

In a second one of the steps, the host company provides an exclusive licensing package to the third party company. Such an exclusive licensing package includes a short-term licensing agreement. The exclusive licensing package preferably includes a non-disclosure agreement for the product.

In a third step, after a predetermined time interval has lapsed, the host company contacts the third party company for verifying receipt of the exclusive licensing package. In a fourth step, upon request from the third party company, the host company provides a long-term exclusive licensing agreement to the third party company after the short-term licensing agreement is no longer enforceable. Such short-term and long-term exclusive licensing agreements are executed by at least the inventor, the third party company and the host company.

The business method of the present invention may further include the step of the host company requesting an independent attorney to work with the inventor and the third party company for obtaining intellectual property protection on the product.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGS. 4-14 illustrate various correspondence letters that are communicated between the host company and the third party company, which explain the short-term licensing agreements and non-disclosure agreements, for example. It is noted that all such correspondence letters are hereby claimed as proprietary documents wherein copyright ownership is made. All rights are served under national and international copyright laws regarding such correspondence letters.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
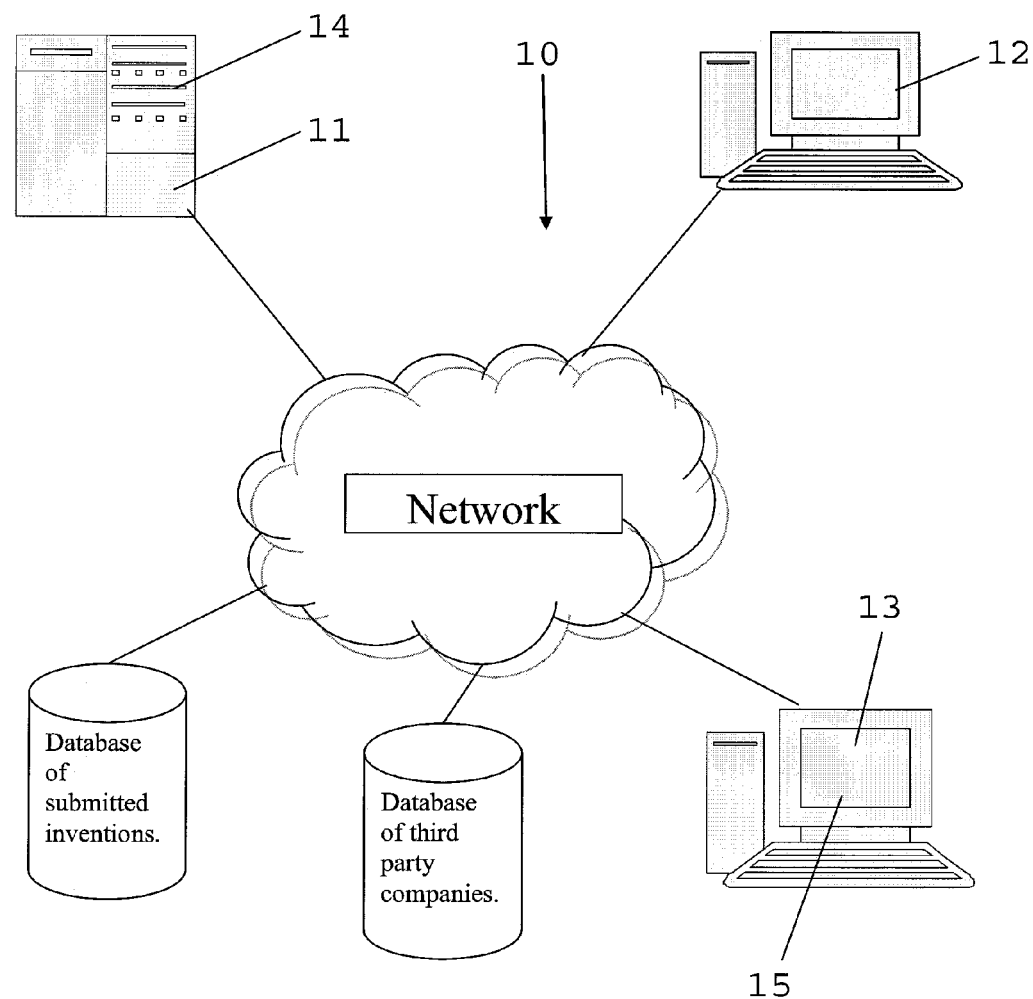
FIG. 1 is a schematic diagram showing an interrelationship between the host and third party companies as well as the databases of inventors and inventions maintained by the host company, in accordance with the present invention.
Figure 2:
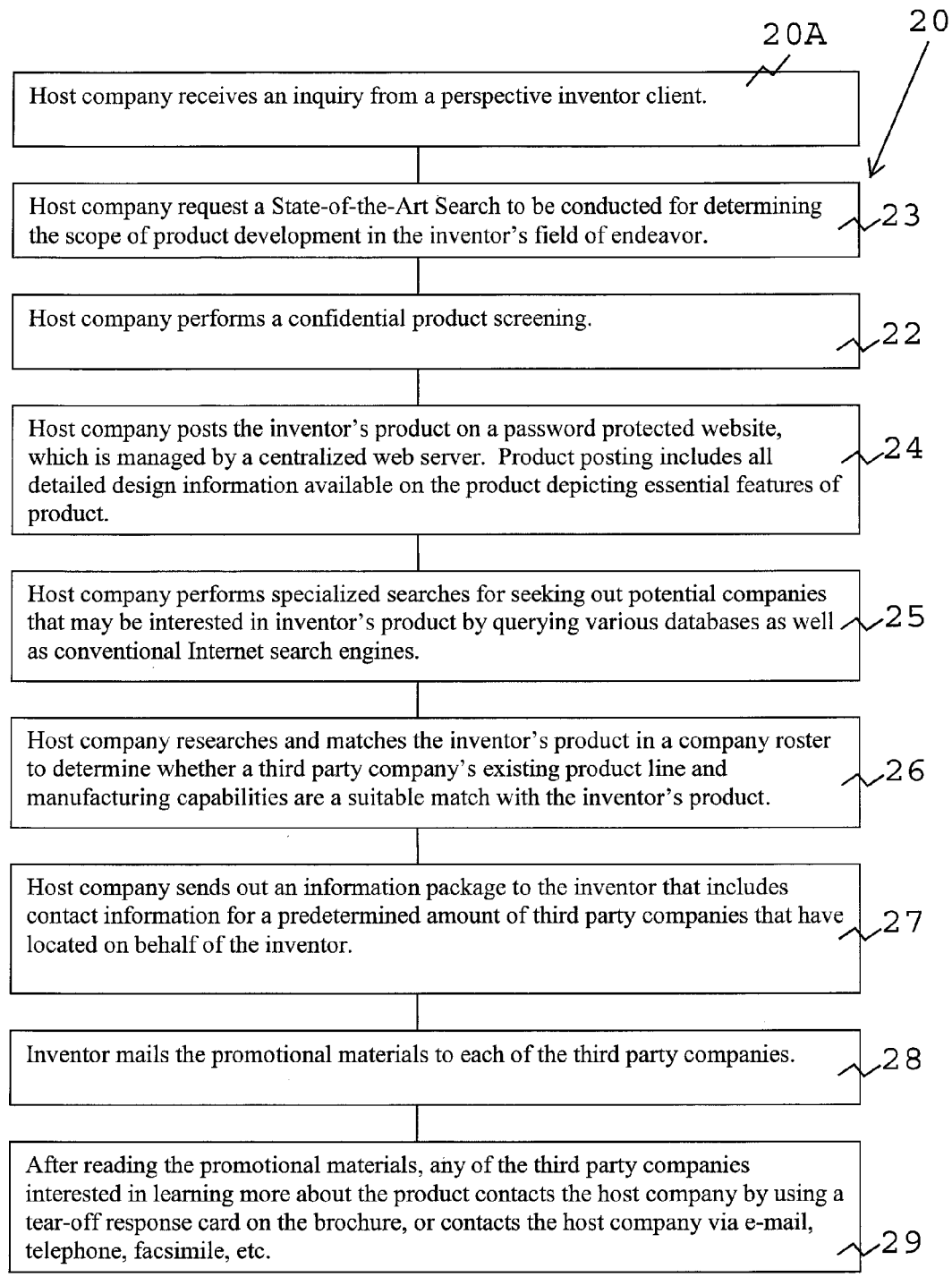
FIG. 2 is a flow chart showing sequential method steps for securing licensing agreements on new products, in accordance with the present invention.
Figure 2:
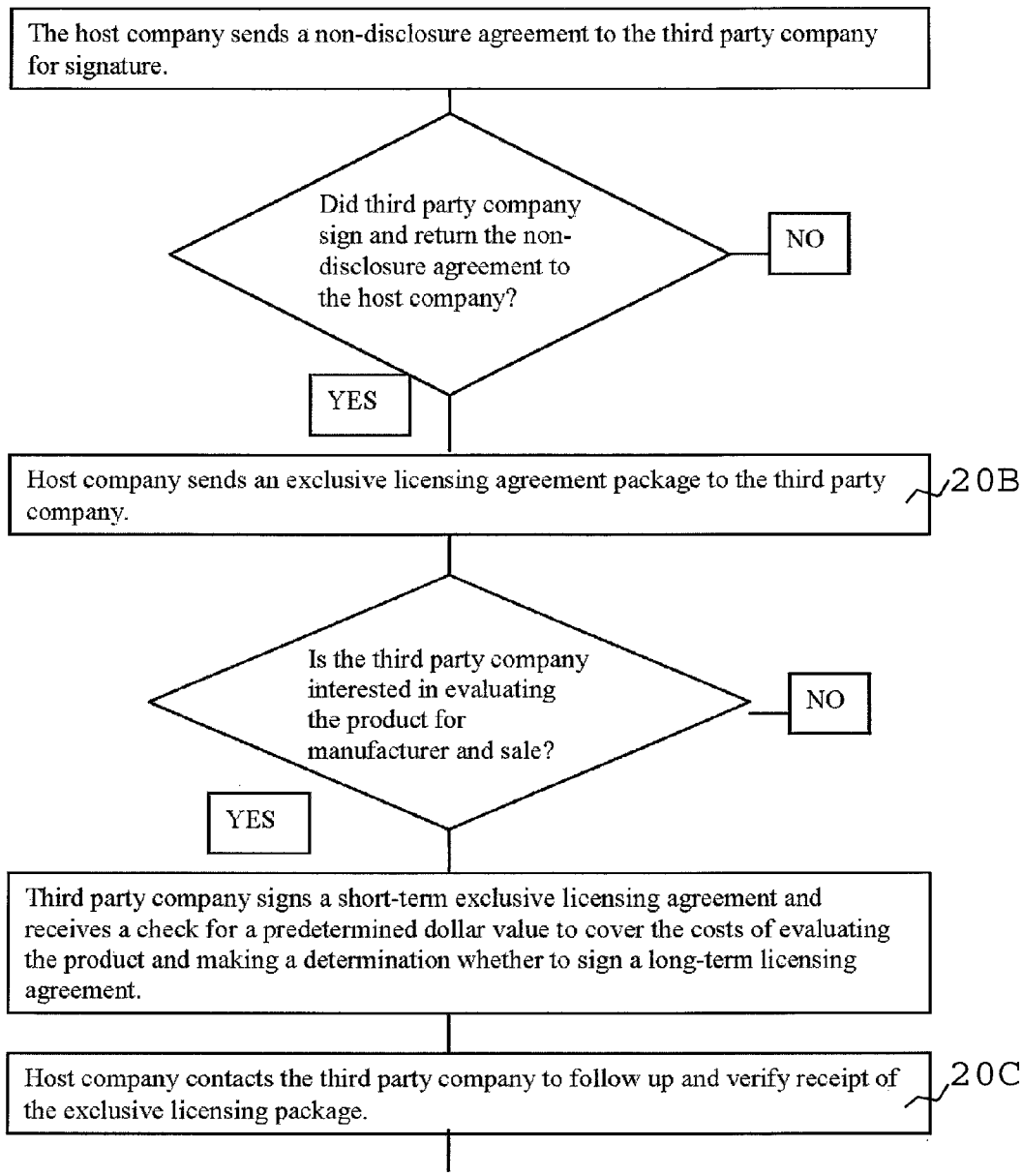
Figure 2:
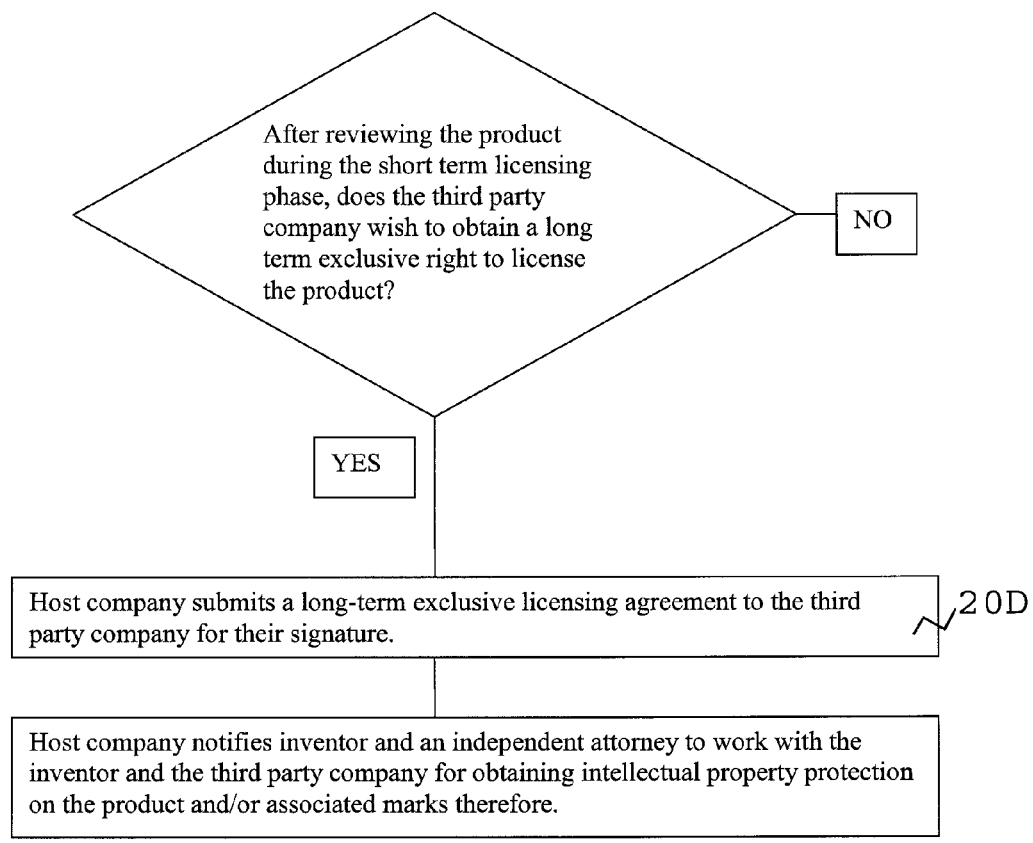
Figure 3:
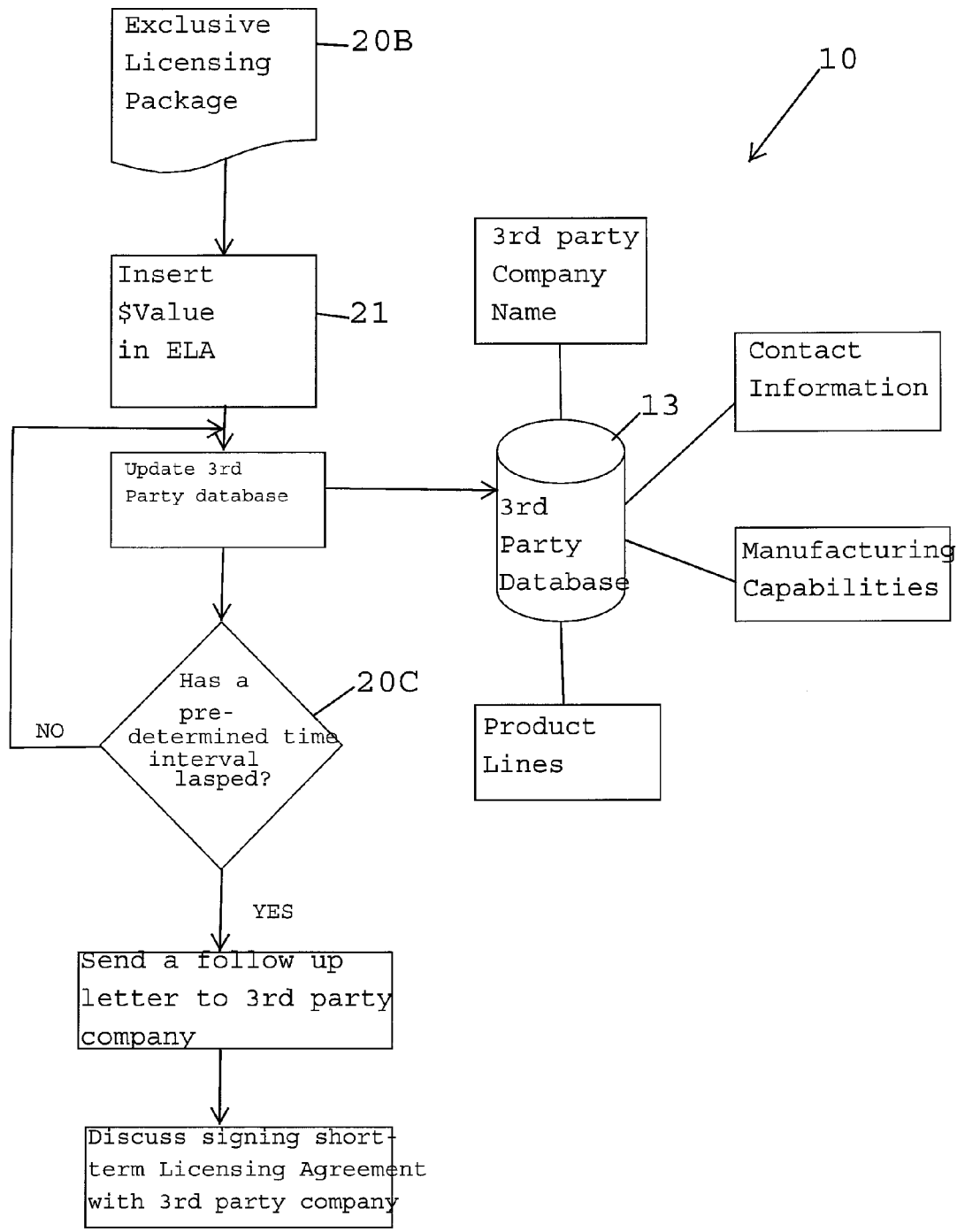
FIG. 3 is a schematic block diagram of the method shown in FIGS. 1 and 2.

The method of this executing the present invention is referred to generally in FIGS. 1-3 by the reference numeral 10 and is intended to provide a business method for securing licensing agreements on new products. It should be understood that the business method 10 may be used to secure licensing agreements on many different types of products and should not be limited in use to only one specific product field.

Referring initially to FIGS. 1 and 2, the method 10 includes a plurality of steps 20. In a first one 20A of such steps 20, a host company 11 (typically an invention promotion company or like broker) receives an inquiry from a perspective inventor client 12. The inventor client 12 fills out an invention disclosure form and submits same with at least one sketch of the product to the host company 11. The sketch may include a series of preliminary drawings or a complete computer-aided rendition of the product. Photographs and prototypes may also be received by the host company 11. Thus, the inquiry discloses the product to the host company 11 in such a manner that the host company 11 can understand the product. It is noted, if the invention disclosure papers are not written in English, the host company 11 may request a translation of same.

Step 20A may further include a step 22 where the host company 11 performs a confidential screening on the product, which identifies product types that are not accepted by the host company 11. Confidential product screening, which involves checking the submitted product against a list of product categories that the host company 11 does not work with. In yet another step 26, the host company 11 preferably matches the product in a proprietary product roster, developed and maintained by the host company 11, to determine whether existing product lines and existing manufacturing capabilities of the third party company 13 are a suitable match with the product. Thus, the host company 11 performs specialized searches for seeking out at least one third party company 13 (typically a manufacturer, for example) that is interested in making the product.

The host company 11 maintains a proprietary, in-house invention database categorized by industry, category, and subcategory. The host company 11 has a functionality in their database that allows them to search out ideas by industry and create a "found set" of all of the press releases and brochures (which are the two pieces of "preliminary information" that the host company can share with a third party company without having them sign a non-disclosure agreement) for ideas that fall in this category.

During step 20A, the host company 11 also requests a state-of-the-art search to be conducted on the product for advantageously and effectively determining a scope of product development in a field of endeavor related to the product. It is noted that the host company 11 requests an independent third party vendor to conduct the search. Such a vendor is an entity that is well experienced in searching similar products on public and government maintained databases.

Still referring to FIG. 2, step 20A may further include a step 24 where the host company 11 posts the product on a password protected website, which is managed by a centralized web server 14. Such a product posting step 24 preferably includes all detailed design information available on the product, which depicts essential features of the product, which is advantageous for allowing the prospective third party companies 13 to more effectively determine their interest and need for a particular product.

In a further step 27, the host company 11 preferably sends an information package to the inventor 12. Such an information package preferably includes contact information for a predetermined amount of third party companies 13 that have been located on behalf of the inventor 12. The inventor 12 is instructed to contact the located third party companies 13, to initiate an interest in their product.

Still referring to FIG. 2, step 20A may further include a step 28 where the inventor 12 mails the promotional materials to each of the interested third party companies 13. After reading the promotional materials, any third party companies 13 that are interested in learning more about the product contacts the host company 11 via a communication medium 15, as shown in step 29. Such a communication medium 15 includes at least one communication medium 15 selected from the group including an email message, a telephone call, a fax transmission and a tear off flyer, for example. The convenient tear off response card is included in the exclusive licensing package for facilitating a response from the third party company 13.

Upon receiving an inquiry from the third party company 13, a non-disclosure agreement is prepared and sent to the third party company 13. It is important to note that all disclosures made to the third party company 13 are classified as private disclosures and not public disclosures for the purposes of not triggering the one-year "on sale" and "public disclosure" rules under 35 U.S.C. §102. The non-disclosure agreement for the product is a crucial feature for ensuring that the inventor 12 can maintain a satisfactory level of confidentiality on his/her product until a final licensing agreement has been established as well as preserving the right to later patent the product. As shown in FIG. 4, a conventional non-disclosure agreement is preferably employed, as well known to a person of ordinary skill in the art. Again, this is crucial for preserving the inventor client's right to pursue patent protection in the future. The third party company 13 typically signs the non-disclosure agreement on the inventor's behalf. A copy of the non-disclosure agreement is mailed to the inventor along with an explanatory cover letter, shown in FIG. 9.

If the non-disclosure agreement is not received after a predetermined time interval has lapsed, the host company 11 sends a follow up letter to the third party company 13. An example of the follow up letter is shown in FIG. 5. Upon receiving the signed non-disclosure agreement back from the third party company 13, the exclusive licensing agreement package is then prepared by the host company 11. Referring to FIG. 2, in a second one 20B of the steps 20, the host company 11 sends the exclusive licensing package to the third party company 13. Such an exclusive licensing agreement preferably includes the following:

a) access to the invention website;

b) an explanatory 2-page cover letter (as illustrated in FIG. 6, for example) that provides the third party company 13 an overview of the host company's 11 role in the promotion of the invention, as well as the opportunity to license the invention for a 90 day period in order to further assess whether they want to license the product on a long-term basis;

c) the exclusive licensing agreement, which is typically a one page document (shown in FIG. 7, for example);

d) if available, an interactive virtual reality prototype for the invention on CD-ROM; and e) in most cases, a check for $1000.00 made payable to the third party company 13 is also enclosed, as an advance reimbursement of potential development costs the third party company 13 might incur during the initial 90 days while they research the invention further. This amount is referred to as a "development bonus" in the agreement. There are instances when the check is not sent, and in these cases, the host company 11 has a different version of the 2-page letter and the exclusive licensing agreement that omits the mention of the development bonus but is otherwise the same as the regular version.

As noted above, the exclusive licensing package provides a full color printout of the product (as displayed on the website server), and an interactive virtual reality CD-ROM (if available). In some instances, the exclusive licensing package, may not include a virtual reality CD-ROM. The sample letters illustrated in FIGS. 10-11, provide such an instance wherein only the private website username and password are provided for allowing the third party company 13 to evaluate the product, without a virtual reality CD-ROM.

FIGS. 12-13 illustrate sample correspondence letters, which the host company 11 sends to the third party company 13 with the exclusive licensing package. As can be seen, the package includes a short-term licensing agreement and the introductory letter greeting the third party company 13 and providing an explanation of the host company's 11 proposal and business goals, for example. The color flyer illustrates the host company's 11 booth and a few licensing employees participating at a trade show. It such a situation, no development bonus is provided and the invention's virtual reality prototype CD is optionally submitted to the third party company 13.

Regardless of which correspondence letters are sent to the third party company, it is critical to note that even through the third party company 13 executes the short-term exclusive licensing agreement and cashes the development bonus, the third party company 13 is not obligated to further evaluate the product for manufacture or license beyond the initial short-term period (typically about 90 days). Thus, prior art shortcomings are overcome by offering a risk-free opportunity for the third party company 13 to evaluate the product, while being compensated for their time and efforts during the initial 90 day review period.

As noted above in element "e" listed hereinabove, step 20A may further include step 21 wherein the host company 11 sends a payment for a predetermined dollar value to the third party company 13 for effectively and conveniently covering the costs of evaluating the product. Such a payment is called the development bonus. If the third party company 13 is not located in the United States or does not have a physical address with contact telephone numbers, which can be verified, the host company 11 may not submit the development bonus until the host company 11 can be assured that the third party company 13 is trustworthy. Such a predetermined dollar value is greater than or equal to one United States dollar and, preferably, about $1000.00. Of course, before a payment is made to the third party company 13, the non-disclosure agreement is sent out to the third party company 13 for their signature.

In a third step 20C, after a predetermined time interval has lapsed from the date the exclusive licensing package is mailed, the host company 11 contacts the third party company 13 for verifying receipt of the exclusive licensing package. For example, the host company 11 places a series of at least 3 phone calls to the contact person for the third party company 13. Initially, the host company 11 may place a phone call to the third party company 13. The first call typically takes place 2-3 days after the third party company 13 receives the exclusive licensing package. If no one is available, the host company 11 leaves a message and places a follow-up phone call within a few days. Voice mails are left if the person is unavailable. Several communications are initiated by the host company 11 to ensure the third party company 13 has received the exclusive licensing package and understands the terms and conditions set forth in the exclusive licensing agreement. The frequency of subsequent follow-ups varies depending on the circumstances (i.e. sometimes the individual is out for an extended period on a business trip).

In a fourth step 20D, upon request from the third party company 13 and typically after the short-term licensing agreement has expired (or is no longer enforceable), the host company 11 provides a long-term exclusive licensing agreement to the third party company 13. For example, during the 90 day short-term licensing period, the third party company 13 conducts due diligence and evaluates the product for manufacturing and marketing potential. If the third party company 13 is interested in the product and is in agreement to the terms of the long-term agreement, they will execute same and work with the inventor to manufacture and market the product. If the third party company 13 is not interested in licensing the product on a long-term basis, the third party company sends a correspondence letter to the inventor, as shown in FIG. 14.

In some instances, the third party company 13 may offer improvements to the product by modifying a component thereof or suggesting alternate material having better operating characteristics and/or less cost. In such instances, the inventor 12 and third party company 13 work together to design the product in such a manner to increase the likelihood of consumer interest in the product. The short-term and the long-term exclusive licensing agreements are executed by at least one of the inventor 12, the third party company 13 and the host company 11. Agents for all parties may sign on their behalf, respectively. A royalty rate is also negotiated on behalf of the inventor before the long-term licensing agreement is executed by all parties.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A method for improving a success rate for obtaining a licensing agreement on a product that an inventor has submitted to a host company, said method comprising the steps of:
   A. said host company providing and transmitting a licensing package to a third party company, said licensing package including a short-term licensing agreement and access to an invention's website, said third party company and said host company signing said short-term licensing agreement, said host company sending a payment to said third party company wherein said payment has a predetermined dollar value for covering the costs of evaluating said product;
   B. after a predetermined time interval has lapsed, said host company contacting said third party company for verifying receipt of said short-term licensing agreement; and
   C. upon request from said third party company, said host company providing a long-term licensing agreement to said third party company after said short-term licensing agreement is no longer enforceable, said inventor and said third party company executing said long-term licensing agreement;
   wherein said short-term licensing agreement is valid for a term period that is less than a term period of said long-term licensing agreement.

2. The method of claim 1, wherein said predetermined dollar value is greater than or equal to one United States dollar.

3. The method of claim 1, wherein said short-term licensing package comprises: a non-disclosure agreement for said product.

4. The method of claim 1, further comprising the step of:
   D. said host company requesting an independent attorney to work with said inventor and said third party company for obtaining intellectual property protection on said product.

5. A method for improving a success rate for obtaining a licensing agreement on a product that an inventor has submitted to a host company, said method comprising the steps of:
   A. said host company receiving an inquiry from a perspective inventor client, said inquiry disclosing said product to said host company, said third party company and said host company signing said short-term licensing agreement, said host company sending a payment for a predetermined dollar value to said third party company for covering the costs of evaluating said product;
   B. said host company providing and transmitting an exclusive licensing package to a third party company, said exclusive licensing package including a short-term licensing agreement and access to an invention's website;
   C. after a predetermined time interval has lapsed, said host company contacting said third party company for verifying receipt of said exclusive licensing package; and
   D. upon request from said third party company, said host company providing a long-term exclusive licensing agreement to said third party company after said short-term licensing agreement is no longer enforceable, said inventor and said third party company executing said long-term licensing agreement;
   wherein said short-term licensing agreement is valid for a term period that is less than a term period of said long-term licensing agreement.

6. The method of claim 1, wherein said predetermined dollar value is greater than or equal to one United States dollar.

7. The method of claim 5, wherein said exclusive licensing package comprises: a non-disclosure agreement for said product.

8. The method of claim 5, wherein said method further comprises the step of:
E. said host company requesting an independent attorney to work with said inventor and said third party company for obtaining intellectual property protection on said product.

9. A method for improving a success rate for obtaining a licensing agreement on a product that an inventor has submitted to a host company, said method comprising the steps of:
A. said host company receiving an inquiry from a perspective inventor client, said inquiry disclosing said product to said host company;
B. said host company providing and transmitting an exclusive licensing package to a third party company, said exclusive licensing package including a short-term licensing agreement and access to an invention's website, said third party company and said host company signing said short-term licensing agreement, said host company sending a payment for a predetermined dollar value to said third party company for covering the costs of evaluating said product;
C. after a predetermined time interval has lapsed, said host company contacting said third party company for verifying receipt of said exclusive licensing package; and
D. upon request from said third party company, said host company providing a long-term exclusive licensing agreement to said third party company after said short-term licensing agreement is no longer enforceable, said inventor and said third party company executing said long-term licensing agreement;
wherein said short-term licensing agreement is valid for a term period that is less than a term period of said long-term licensing agreement.

10. The method of claim 9, wherein said predetermined dollar value is greater than or equal to one United States dollar.

11. The method of claim 9, wherein said exclusive licensing package comprises: a non-disclosure agreement for said product.

12. The method of claim 9, wherein said method further comprises the step of:
F. said host company requesting an independent attorney to work with said inventor and said third party company for obtaining intellectual property protection on said product.

13. The method of claim 1, wherein step A further comprises:
ii. said host company performing a confidential screening on said product.

14. The method of claim 13, wherein step A further comprises:
iii. said host company requesting a state-of-the-art search to be conducted on said product for determining a scope of product development in a field of endeavor related to said product.

15. The method of claim 14, wherein step A further comprises:
iv. said host company posting said product on a password protected website, which is managed by a centralized web server, said product posting including a written description of said product and a drawing depicting essential features of said product;
v. said host company performing specialized searches for seeking out at least one of said third party company that may be interested in making said product;
vi. said host company matching said product in a proprietary product roster developed by said host company to determine whether an existing product line and existing manufacturing capabilities of said at least one third party company are a suitable match with said product; and
vii. said host company sending an information package to said inventor, said information package including a plurality of press release copies and a plurality of product brochure copies along with contact information for said at least one of third party company that has been located on behalf of said inventor.

16. The method of claim 15, wherein step A further comprises:
viii. said inventor mailing said press releases and said product brochures to each of said at least one third party company; and
ix. after reading said press releases and said product brochures, said at least one third party company interested in learning more about the product, contacting said host company via a communication medium.

17. The method of claim 16, wherein said communication medium comprises: at least one communication medium selected from the group including an email message, a telephone call and a fax transmission.

* * * * *